United States Patent [19]

Sisk

[11] 4,094,165
[45] June 13, 1978

[54] LOSS HEAT SUPPRESSION APPARATUS AND METHOD FOR HEAT PUMP

[75] Inventor: Francis J. Sisk, Apollo, Pa.

[73] Assignee: Electric Power Research Institute, Inc., Palo Alto, Calif.

[21] Appl. No.: 743,422

[22] Filed: Nov. 19, 1976

[51] Int. Cl.² .............................................. F25B 1/00
[52] U.S. Cl. ........................................ 62/115; 62/324; 62/471; 62/503; 62/505; 417/368; 417/369; 417/902
[58] Field of Search ................. 62/503, 505, 471, 324, 62/115; 417/368, 369, 372, 902

[56] References Cited

U.S. PATENT DOCUMENTS

| 2,504,528 | 4/1950 | Hume ................................. 417/902 |
| 2,541,736 | 2/1951 | Alexander ........................... 126/263 |
| 3,207,149 | 9/1965 | Spihdler ............................. 126/263 |
| 3,217,193 | 11/1965 | Rayner ............................... 62/505 |
| 3,233,822 | 2/1966 | Comstock et al. .................... 417/902 |
| 3,774,589 | 11/1973 | Kober ................................ 126/263 |
| 3,924,603 | 12/1975 | Citapin .............................. 126/263 |
| 3,980,070 | 9/1976 | Krupa ................................ 126/263 |

*Primary Examiner*—Ronald C. Capossela
*Attorney, Agent, or Firm*—Townsend and Townsend

[57] ABSTRACT

A compressor unit for use with a heat pump system wherein a motor-driven compressor is disposed within a casing which can be placed indoors or outdoors. Vapor from the suction side of the system is directed into and through the compressor, through an oil separator-muffler, and then into contact with liquid from the high side of the system, the liquid being directed onto a rotating disk to form a spray which contacts and thereby desuperheats the compressor discharge vapor. The desuperheated vapor then moves into and through the air gaps of the compressor motor in heat exchange relationship thereto where it is re-superheated. The re-superheated vapor then leaves the fan ports of the motor and enters the open top of a vertical standpipe which also receives the excess liquid collected in a trough surrounding the upper end bell of the motor. The liquid is entrained in the re-superheated vapor and moves therewith out of the casing toward the four-way valve and the condenser coil of the system.

12 Claims, 1 Drawing Figure

U.S. Patent    June 13, 1978    4,094,165
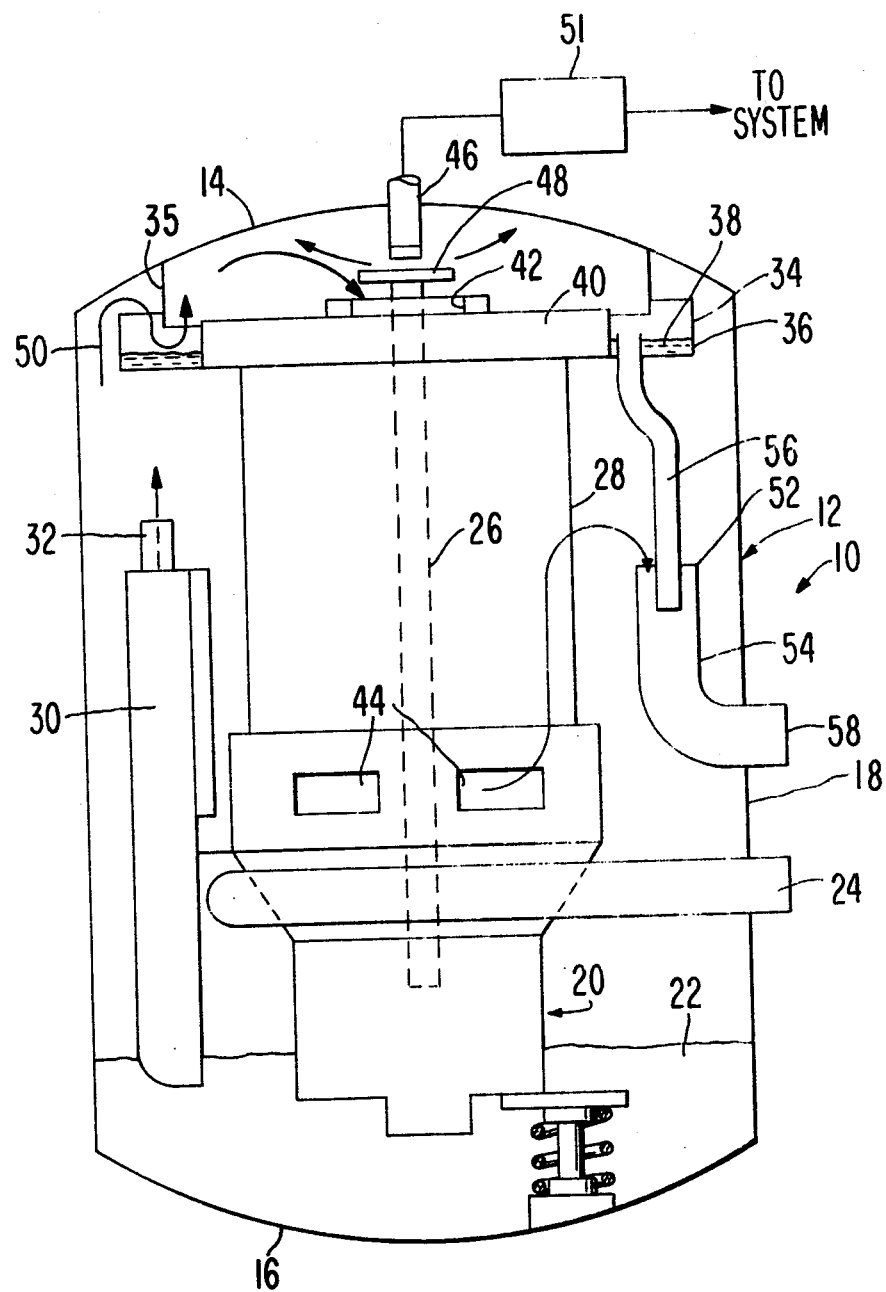

LOSS HEAT SUPPRESSION APPARATUS AND METHOD FOR HEAT PUMP

This invention was made under contract with or supported by the Electrical Power Research Institute, Inc.

This invention relates to improvements in compressors for heat pumps and, more particularly, to an improved compressor unit which suppresses heat loss generated therein and permits the heat loss to be used for heating in winter and to be discharged to the atmosphere in summer.

BACKGROUND OF THE INVENTION

Heat pump compressors are currently mounted in hermatically sealed vessels with low side (suction) vapor delivered to the vessel where it serves as the coolant for the motor and oil. The vessel is installed outdoors and is not insulated. In the heating mode, heat losses generated in the vessel are lost to the atmosphere by convection. If the vessel is installed indoors to conserve this heat, the sensible cooling capacity is reduced in the summer cooling mode by the heat which escapes into the space to be cooled. It would be desirable to use such heat losses in the winter to warm an interior space and to be able to vent the heat losses to atmosphere during the summer. A need has, therefore, arisen to provide apparatus and a method to accomplish this to render the heat pump more efficient all year around.

SUMMARY OF THE INVENTION

The present invention satisfies the foregoing need by providing an improved compressor unit which operates to de-superheat the compressor discharge vapor by direct contact of such vapor with a system high side liquid spray within the casing for the compressor, then separating the excess liquid from the de-superheated vapor and delivering the vapor through the air gaps of the motor of the compressor to cool the same and to re-superheat the vapor. Excess liquid is re-entrained into the re-superheated vapor as it is discharged from the compressor unit for flow to the four-way valve and condenser coil of the heat pump system.

The vapor is de-superheated when it is directed into intimate contact with a spray of a portion of the high side liquid, the spray being formed when the liquid enters the casing of the compressor unit and contacts a rotating disk on the end of the motor drive shaft, the disk being aligned with the pipe carrying the liquid into the casing. The excess liquid drains into a shallow trough or reservoir surrounding the motor end bell as the vapor enters the opening surrounding the motor drive shaft and extending through the motor end bell. The vapor passes through the air gaps of the motor and the compressor and leaves the same through the motor fan ports, then moves upwardly and into the open top of a vertical standpipe which also communicates with a small diameter drain pipe from the reservoir which receives overflow liquid therefrom. As the liquid falls into the small diameter pipe and then into the standpipe, vapor is directed into the standpipe and entrains the liquid, following which the vapor with entrained liquid therein leaves the casing for flow toward the four-way valve and condenser coil of the system.

The primary object of this invention, therefore, is to provide an improved apparatus and method for utilizing the heat normally lost to the atmosphere in a hermetic vessel containing the compressor so that the heat loss can be used in winter cooling mode to heat the interior of a space yet such heat loss can be discharged to the atmosphere in a summer cooling mode.

Another object of this invention is to provide apparatus and method of the type described wherein the superheated compressor discharge vapor is contacted by a portion of the high side liquid of the heat pump system to de-superheat the vapor, then the excess de-superheating liquid is separated from the vapor so that the vapor can move in heat exchange relationship through the motor and compressor and become re-superheated, following which the re-superheated vapor can entrain the liquid therein as the vapor flows away from the compressor toward the four-way valve of the system.

Other objects of this invention will become apparent as the following specification progresses, reference being had to the accompanying drawing which includes a single FIGURE showing a schematic view of the compressor unit of the present invention.

Compressor unit 10 includes an outer casing 12 of generally cylindrical shape having a top 14 and a bottom 16 at the upper and lower ends, respectively, of a continuous sidewall 18. A compressor 20 disposed within casing 12 above an oil sump 22 has an inlet port 24 for receiving suction vapor from the low side of a heat pump system (not shown) of which compressor unit 10 forms a part. Compressor 20 is driven by the drive shaft 26 of a motor 28 mounted in any suitable manner within casing 12 between compressor 20 and top 14. Compressor can be of any suitable type, such as a reciprocating type which is splash lubricated.

An oil separator/muffler 30 is disposed within casing 12 and is in fluid communication with the outlet compressor 20 to receive superheated discharge vapor therefrom. Muffler 30 strips the oil from the vapor and allows the vapor to discharge through a port 32 into casing 12, where it passes upwardly and over the continuous sidewall 34 of a shallow trough or reservoir 36 containing liquid 38, the reservoir surrounding the upper end bell 40 of motor 28, such end bell having an opening 42 therethrough whereby de-superheated vapor can flow into the motor housing and through the air gaps thereof to cool the same and to cause re-superheating of the vapor. Upon being re-superheated, the vapor contains the heat energy normally lost by convection to the atmosphere when conventional compressor units are used. The re-superheated vapor leaves the motor housing through motor fan ports 44 after the vapor has cooled both the motor and the compressor.

A portion of high side liquid of the system is directed by a pipe 46 into top 14 and onto an atomizer table or disk 48 on the upper end of motor shaft 26. Liquid passing through pipe 46 is directed onto disk 48 as it rotates and is sprayed outwardly and into contact with the vapor flowing along the path denoted by the curved arrow 50 to de-superheat the vapor. The excess liquid gravitates into reservoir 36 and is removed therfrom in a manner hereinafter described.

Re-superheated vapor leaving fan ports 44 flows through casing 12 and into the open top 52 of an L-shaped standpipe 54 which passes lateraly outwardly through casing 12. A drain pipe 56 leading from the reservoir 36 allows liquid collected in the reservoir to overflow into pipe 56 and to become entrained in the re-superheated discharge vapor, whereby the vapor with entrained liquid therein will be at outlet 58 directed to the four-way valve and condenser coil of the heat pump system.

In operation, suction vapor enters port 24 and is directed into compressor 20 where it is compressed and moved through muffler 30, out of port 32 and upwardly over the outer sidewall 34 of reservoir 36 and beneath an annular baffle 35 depending from top 14, such path of travel being denoted by arrow 50. Thus, the vapor moves into the region beneath top 14. De-superheating liquid is obtained for pipe 46 from the high side liquid line just ahead of the refrigerant flow control device of the heat pump system and is pumped to a pressure higher than compressor discharge pressure structure 51 which can be any one of the following means:

1. An electric motor driven hermetic pump independent of unit 10;
2. A pump driven by the compressor shaft and inside of unit 10, such as an automotive fuel pump; and
3. A hermetic pump driven by a hydraulic motor whose energy source is the liquid flow from high side to low side, the motor preceding the refrigerant control device in the main liquid line.

As the liquid is directed onto disk 48, it is sprayed laterally in all directions and contacts the vapor and de-superheats the same before the vapor enters opening 42 in motor end bell 40. The vapor then passes through the motor and serves as a coolant as well as cooling the compressor itself. The excess liquid in the vicinity of disk 48 is separated by gravity from the de-superheated vapor and is received in reservoir 36 where it overflows into the open top of a liquid drain pipe 56 and into standpipe 54.

Re-superheated vapor from fan ports 44 passes upwardly through casing 12 and into open top 52 of standpipe 54 where it entrains the liquid falling from pipe 56 to present outlet vapor which is directed through the four-way valve and condenser coil of the system. This process continues and the heat loss absorption occurs in re-superheating the vapor as it flows through the air gaps of the motor to cool the same on its way to the four-way valve and condenser coil coupled with port 58. Normally, unit 10 is indoors but it can either be indoors or outdoors. Thus, the present invention provides a means of removing the heat loss to indoors in winter and to outdoors in summer with such means being free of any plumbing complications and being of low cost. Thus, the heat loss is provided to the high side vapor which is switched to the indoor coil in winter and to the outdoor coil in summer by apparatus forming part of this system and being conventional in use.

I claim:

1. A compressor unit for a heat pump system comprising: a casing; a compressor mounted in the casing and having an inlet and a vapor outlet communicating with the interior of the casing to direct discharge vapor therinto; a motor within the casing and coupled to the compressor for driving the same, the motor having a housing provided with air gaps therethrough; means coupled with the casing for directing pressurized liquid from the system into the casing; means coupled with the directing means for spraying the liquid into the path of travel of the discharge vapor therefrom to de-superheat the discharge vapor, the motor having an opening permitting the discharge vapor to flow thereinto and through the air gaps thereof to cool the same and to re-superheat the vapor; and means for receiving the liquid and the re-superheated vapor to cause entrainment of the liquid in the vapor for flow to the system.

2. A compressor unit as set forth in claim 1, wherein said spraying means includes a rotatable disk aligned with said directing means.

3. A compressor unit as set forth in claim 2, wherein said motor has a drive shaft, said disk being on one end of the drive shaft.

4. A compressor unit as set forth in claim 1, wherein the receiving means comprises a standpipe having an open top and provided with means for directing liquid thereinto as discharge vapor flows into the open top.

5. A compressor unit as set forth in claim 1, wherein is included a trough in said casing for collecting excess liquid, said receiving means including a drain pipe coupled with said trough for receiving overflow liquid therefrom.

6. A compressor unit as set forth in claim 5, wherein said receiving means further includes a standpipe having an open top below said trough, said drain pipe extending into said open top, the size of the latter being sufficient to allow re-superheated vapor to pass thereinto and to combine with and entrain the liquid.

7. A compressor unit as set forth in claim 1, wherein said casing has a top, said directing means including a pipe extending into said casing through said top thereof.

8. A compressor unit as set forth in claim 7, wherein said motor having a drive shaft extending vertically within the casing, the upper end of the drive shaft being spaced below and in alignment with said pipe, there being a disk on the upper end of the shaft for rotation therewith, and including an open top trough on the upper end of the motor in surrounding relationship thereto.

9. A method of compressing the working fluid of a heat pump system having a motor-driven compressor comprising: compressing the working fluid to form a superheated vapor; moving the superheated vapor into contact with liquid under pressure from the system to de-superheat the vapor; directing the de-superheated vapor into heat exchange relationship to the motor of the compressor to re-superheat the vapor; and entraining the liquid into the re-superheated vapor before the vapor returns to the system.

10. A method as set forth in claim 9, wherein said moving step includes spraying the liquid into the path of travel of the superheated vapor.

11. A method as set forth in claim 9, wherein is included the step of collecting the liquid in a region before it is entrained into the re-superheated vapor, said entraining step including, causing a flow of the liquid from said region and into contact with said re-superheated vapor.

12. A method as set forth in claim 9, wherein said moving step includes combining the superheated vapor and the liquid in a confined region, and injecting the liquid into the region at a pressure greater than the pressure of said superheated vapor.

* * * * *